US012282277B2

(12) United States Patent
Ishioka

(10) Patent No.: US 12,282,277 B2
(45) Date of Patent: Apr. 22, 2025

(54) IMAGE FORMING APPARATUS WITH METALLIC ROLLER CORRECTING CURL OF SHEET BY DEFORMING ELASTIC ROLLER

(71) Applicant: CANON KABUSHIKI KAISHA, Tokyo (JP)

(72) Inventor: Naoki Ishioka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/464,435

(22) Filed: Sep. 11, 2023

(65) Prior Publication Data

US 2024/0134307 A1 Apr. 25, 2024
US 2024/0231264 A9 Jul. 11, 2024

(30) Foreign Application Priority Data

Oct. 20, 2022 (JP) ................................ 2022-168301

(51) Int. Cl.
*G03G 15/20* (2006.01)
*G03G 15/00* (2006.01)
*G03G 15/23* (2006.01)

(52) U.S. Cl.
CPC ....... *G03G 15/2064* (2013.01); *G03G 15/234* (2013.01); *G03G 15/6502* (2013.01); *G03G 15/6576* (2013.01); *G03G 2215/2025* (2013.01)

(58) Field of Classification Search
USPC .......................................................... 399/328
See application file for complete search history.

(56) References Cited

U.S. PATENT DOCUMENTS 5,287,157 A * 2/1994 Miyazato ........... G03G 15/6576 162/197
7,942,411 B2 5/2011 Ishioka
8,382,101 B2 2/2013 Ishioka
10,618,760 B2 4/2020 Ishioka
10,983,472 B2 4/2021 Inoue
2006/0245795 A1* 11/2006 Kamiyama ........ G03G 15/2064 399/322
2014/0234002 A1* 8/2014 Oohara .............. G03G 15/6576 399/406
2020/0363764 A1 11/2020 Inoue
2022/0041389 A1 2/2022 Ishioka

FOREIGN PATENT DOCUMENTS

JP 2020-187316 A 11/2020

* cited by examiner

*Primary Examiner* — Quana Grainger
(74) *Attorney, Agent, or Firm* — Venable LLP

(57) ABSTRACT

An image forming apparatus includes an image forming portion, a fixing portion, a discharging portion, a discharge path toward the discharging portion, a reversing portion including a reverse path branched from the discharge path and to reverse the sheet and a reconveying path branched from the reverse path and through which the sheet reversed in the reversing portion is reconveyed to the image forming portion. A curl correcting portion is disposed in the reconveying path and corrects curl of the sheet conveyed through the reconveying path. The curl correcting portion includes a first correcting portion to apply a force to upwardly bend the first side to the sheet conveyed through the reconveying path, and a second correcting portion to apply a force to downwardly bend the first side. The second correcting portion is disposed downstream of the first correcting portion with respect to a conveyance direction of the sheet.

9 Claims, 9 Drawing Sheets

IMAGE FORMING APPARATUS WITH METALLIC ROLLER CORRECTING CURL OF SHEET BY DEFORMING ELASTIC ROLLER

FIELD OF THE INVENTION RELATED ART

The present invention relates to an image forming apparatus such as a printer, copier, FAX, or multifunction machine.

In a fixing portion of an image forming apparatus, after a toner image is transferred onto a sheet in the transfer portion, heat and pressure are applied to the sheet while nipping and conveying the sheet in the fixing portion to fix the toner image on the sheet. During double-sided image formation, in which a toner image is formed on both sides of a sheet, after the toner image is fixed on the first side, the sheet is conveyed toward the transfer portion for transferring the toner image onto the second side by reversing the conveying direction of the sheet so that the leading and trailing ends of the sheet are switched in the double-sided conveying path. A sheet that has passed through the fixing portion may curl due to the temperature difference between the front and back sides caused by the heat generated during the toner image fixing process. If a curled sheet is conveyed through the double-sided conveying path after the first side toner image is fixed, the sheet may jam in the transfer portion or fixing portion, or the sheet may wrinkle after passing through the transfer portion or fixing portion.

Japanese Laid-Open Patent Application No. 2020-187316 proposes an image forming apparatus with a curl correcting portion in the double-sided image forming apparatus, which corrects (straightens) the curl of sheets in the double-sided conveying path. As in the apparatus described in Japanese Laid-Open Patent Application No. 2020-187316, the curl correcting portion has an upper curl correcting portion and a lower curl correcting portion. The upper curl correcting portion is arranged to correct the upper convex shape curl by lower curling the sheet, and the lower curl correcting portion is arranged to correct the lower convex shape curl by upper curling the sheet.

By the way, with the recent downsizing of image forming apparatuses, double-sided conveying paths are compactly formed and therefore have multiple curved portions that are curved into a steeply curved shape with a small curvature ratio. In this case, a strong load is applied to the sheet being conveyed in a curved state along the curved portions, which causes an upper convex curl. Depending on the type of sheet, an upper convex curl may be caused by the curved portions, whether or not the curl is caused by heat from the fixing portion. However, in the apparatus described in Japanese Laid-Open Patent Application No. 2020-187316 above, the upper curl correction portion for correcting upper convex curl was located upstream of the lower curl correction portion for correcting lower convex curl. Therefore, depending on the type of sheet, even if the upper curl is corrected by the upper curl correcting portion, the lower curl correcting portion may cause the sheet to curl in an upper convex shape.

SUMMARY OF THE INVENTION

One embodiment of the present invention is an image forming apparatus comprising: an image forming portion configured to form a toner image on a sheet; a fixing portion configured to fix the toner image on the sheet on which the toner image is formed by the image forming portion; a discharging portion to which the sheet passing through the fixing portion is discharged; a discharge conveying path configured to convey the sheet passing through the fixing portion toward the discharging portion; a reversing portion including a reverse conveying path branched from the discharge conveying path and configured to reverse the sheet conveyed to the reverse conveying path in a first conveying direction to a second conveying direction opposite to the first conveying direction; a reconveying path branched from the reverse conveying path and, during double side image forming operation in which the toner image is formed and fixed on a first side and a second side opposite to the first side of the sheet, through which the sheet reversed in the reversing portion is reconveyed to the image forming portion after fixing the toner image of the first side; and a curl correcting portion disposed in the reconveying path and capable of correcting curl of the sheet conveyed through the reconveying path, wherein the curl correcting portion includes a first correcting portion configured to apply a force to upwardly bend a side of the first side to the sheet conveyed through the reconveying path, and a second correcting portion configured to apply a force to downwardly bend the side of the first side, and wherein the second correcting portion is disposed downstream of the first correcting portion with respect to a conveyance direction of the sheet.

Further features of the present invention will become apparent from the following description of exemplary embodiments with reference to the attached drawings.

DESCRIPTION OF THE EMBODIMENTS

Figure 1:
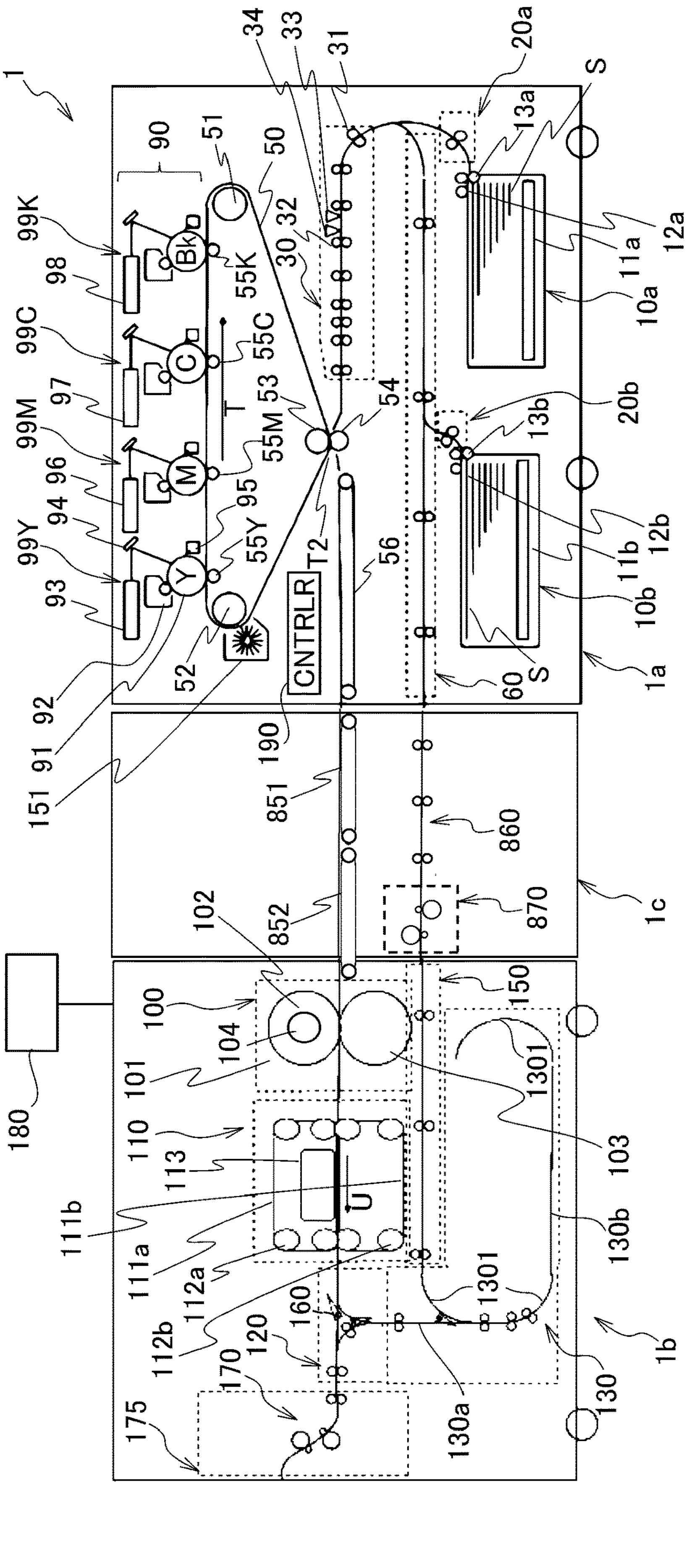
FIG. 1 is a schematic view of the image forming apparatus of the present embodiment.

The following is a description of an embodiment for implementing the present invention, with reference to the drawings. FIG. 1 is a schematic view of an image forming apparatus 1 of the present embodiment. The image forming apparatus 1 shown in FIG. 1 is an electrophotographic full-color laser beam printer. The image forming apparatus 1 forms a toner image on a sheet S based on image data sent from a document reader connected to the main body of the apparatus (not shown) or an external device such as a personal computer connected to the main body of the apparatus for data input/output (not shown).

The image forming apparatus 1 in the present embodiment consists of a first casing 1*a* accommodating various units that feed a sheet S and form an image on the sheet S, a second casing 1*b* accommodating various units that fix a toner image and cool the sheet S, and a third casing 1*c* connected to the first casing 1*a* and the second casing 1*b* to enable delivery of the sheet S between the first casing 1*a* and the second casing 1*b*.

The first casing 1*a* accommodates feeding units 10*a* and 10*b*, drawing units 20*a* and 20*b*, a registration unit 30, an image forming unit 90, a first double-sided conveying path 60, and a first pre-fixing conveyance path 56. The second casing 1*b* accommodates a fixing unit 100, a cooling unit 110, a discharge conveying portion 120, a reversing portion 130, a second double-sided conveying path 150, a discharging decurling unit 170, and a discharge portion 175. The third casing 1*c* accommodates a second fixing pre-conveyance path 851, a third fixing pre-conveyance path 852, an intermediate double-sided conveying path 860, and a double-sided decurling unit 870. In the present embodiment, the reverse conveying paths (130*a*, 130*b*) of the reversing portion 130, the second double-sided conveying path 150, the intermediate double-sided conveying path 860, and the first double-sided conveying path 60 form a series of conveying paths for forming and fixing the toner image on the second side following the first side, during double-sided image formation in which toner images are formed on both sides of a sheet S.

The third casing 1*c* is configured separately from the first casing 1*a* and the second casing 1*b*, and is placed between and connected to the first casing 1*a* and the second casing 1*b* as an optional unit that can be retrofitted to expand the functions of the image forming apparatus 1. In the present embodiment, the third casing 1*c* accommodates the intermediate double-sided conveying path 860, the double-sided decurling unit 870, etc., and functions as a curl correction device capable of correcting curls of a sheet S conveyed on the intermediate double-sided conveying path 860.

The image forming apparatus 1 may consist of a single casing. However, as mentioned above, it is preferable if the third casing 1*c* is a separate unit that can be connected to the first casing 1*a* and the second casing 1*b*, as this will improve maintainability of the image forming apparatus 1 and also facilitate installation of the image forming apparatus 1. Furthermore, it is preferable because a curl correction device can be added as an optional unit to an existing image forming apparatus.

The image forming unit 90 is equipped with four process cartridges 99Y, 99M, 99C, and 99K that form toner images in four colors, yellow (Y), magenta (M), cyan (C), and black (K), respectively, and exposure apparatuses 93, 96, 97, and 98. The process cartridges 99Y, 99M, 99C, and 99K as image forming portions have the same configuration except that the colors of the toner images formed on the sheet S are different, and each has a photosensitive drum 91, a charging roller 95, and a developing device 92.

Below the image forming unit 90, an intermediary transfer belt 50 rotating in the arrow T direction by a driving roller 52 is arranged, and the intermediary transfer belt 50 is wound around a tension roller 51, the driving roller 52, and a secondary transfer inner roller 53. Primary transfer rollers 55Y, 55M, 55C, and 55K are arranged inside the intermediary transfer belt 50, and a secondary transfer outer roller 54 is arranged outside the intermediary transfer belt 50 opposing the secondary transfer inner roller 53.

A feeding unit 10*a* has a lift plate 11*a* that raises and lowers while stacking sheets S, a pick-up roller 12*a* that feeds sheets S stacked on the lift plate 11*a*, and a separation roller pair 13*a* that separates the fed sheets S one by one. Similarly, a feeding unit 10*b* has a lift plate 11*b* that raises and lowers while stacking sheets S, a pick-up roller 12*b* that feeds sheets S stacked on the lift plate 11*b*, and a separating roller pair 13*b* that separates the fed sheets S one by one.

The registration unit 30 has a pre-registration roller pair 31 that conveys the sheet S, a registration roller pair 32 that corrects any skew in the sheet S, a registration sensor 33 that detects the position of the sheet S in the feeding direction, and a contact image sensor 34 that detects the width direction of the sheet S (the direction intersecting the feeding direction).

The fixing unit 100 as the fixing portion has a fixing roller pair 101 for fixing the toner image to the sheet S. The fixing roller pair 101 has a heating roller 102 and a pressure roller 103. The heating roller 102 has a halogen heater 104 as a heat source inside and is heated by the halogen heater 104. The pressure roller 103 is pressurized toward the heating roller 102 by a driving roller (not shown) and contacts the outer circumference of the heating roller 102 to form a fixing nip portion. The fixing unit 100 fixes the toner image on the sheet S by applying heat and pressure to the sheet S while nipping and feeding the sheet S with the toner image formed in the fixing nip portion formed by the heating roller 102 and pressure roller 103. The heating roller 102 and the pressure roller 103 are not limited to cylindrical roller members, but can also be endless belt members.

The cooling unit 110 has an upper cooling belt 111*a* that is rotated in the arrow U direction by the upper cooling driving roller 112*a* and a lower cooling belt 111*b* that is rotated in the arrow U direction by the lower cooling driving roller 112*b*. It also has a heat sink 113 for cooling the sheet S via the upper cooling belt 111*a*. The heat sink 113 is arranged to contact the inner circumference of the upper cooling belt 111*a*. The upper cooling belt 111*a* and the lower cooling driving roller 112*b* are in contact to form a cooling nip portion for nipping and feeding and cooling the sheet S after passing through the fixing unit 100.

Next, the image forming operation of the image forming apparatus 1 is explained. In the process cartridge 99Y, the photosensitive drum 91, which is formed by applying an organic photoconductive layer to the periphery of an aluminum cylinder, for example, is uniformly charged to a predetermined polarity and potential on its surface by the charging roller 95 while being rotated by a driving motor (not shown). When an image signal is input from an external device such as a personal computer (not shown), a laser light corresponding to the image signal is emitted from the exposure unit 93, and the emitted laser light irradiates the surface of the photosensitive drum 91 through a mirror 94. The photosensitive drum 91 is irradiated by the laser light, and an electrostatic latent image is formed on the surface. The electrostatic latent image formed on the photosensitive drum 91 is developed by the developing device 92 using a developer, thereby forming a yellow (Y) toner image on the photosensitive drum 91. In the same way, magenta (M), cyan (C), and black (K) toner images are formed on the respective photosensitive drums of process cartridges 99M, 99C, and 99K.

The toner image of each color formed on each photosensitive drum is primary transferred to the intermediary transfer belt 50 by the primary transfer rollers 55Y, 55M, 55C, 55K. The toner image that has been primary transferred to the intermediary transfer belt 50 is transferred to the secondary transfer nip portion T2 formed by the secondary transfer inner roller 53 and the secondary transfer outer roller 54, as the intermediary transfer belt 50 is rotated by the driving roller 52. The image forming process for each color described above is timed to superimpose on the toner image upstream in the rotation direction of the intermediary transfer belt 50, which is primary transferred on the intermediary transfer belt 50. The toner remaining on the photosensitive drum after the primary transfer is collected by a cleaner (not shown).

In parallel with the above image forming process, a sheet S is fed one by one from one of the feeding units 10*a* and 10*b*, and the fed sheet S is fed toward the registration unit 30 by one of the drawing units 20*a* and 20*b*. The sheet S is then fed toward the secondary transfer nip portion T2 at a predetermined feeding timing after misalignment correction and skew correction are performed by the registration unit 30. The secondary transfer nip portion T2 is a transfer portion formed by the secondary transfer inner roller 53 and the secondary transfer outer roller 54. The toner image on the intermediary transfer belt 50 is secondarily transferred to the sheet S in response to the application of a secondary transfer voltage to the secondary transfer outer roller 54. The toner remaining on the intermediary transfer belt 50 after the secondary transfer is collected by a belt cleaner 151.

The sheet S on which the toner image has been secondary transferred is transported through a first pre-fixing conveying path 56, a second pre-fixing conveying path 851, and a third pre-fixing conveying path 852 toward the fixing unit 100. Then, heat and pressure are applied to the sheet S in the fixing nip portion of the fixing unit 100 to fix the toner on the sheet S. The sheet S that has passed through the fixing unit 100 is conveyed to the cooling unit 110. In the cooling unit 110, the sheet S is cooled by the upper cooling belt 111*a* cooled by the heat sink 113, which removes heat from the sheet S. For example, if the temperature of the sheet S after fixing the toner image that has passed through the fixing unit 100 is approximately 80-90° C., the cooling unit 110 can cool the sheet S to approximately 60-70° C.

If the temperature of sheet S remains high when it is discharged to the discharge tray (not shown), toner sticking between sheets S will occur as they are stacked in the discharge tray. To prevent this, it is preferable to lower the temperature of sheet S to 45-55° C. or lower before discharging it to the discharge tray. However, if the temperature of sheet S is lowered to 45-55° C. or lower, it becomes difficult to correct the curl of sheet S by the discharge decurling unit 170 and the double-sided decurling unit 870, which are described later. Therefore, the cooling unit 110 lowers the temperature of sheet S to 60-70° C. where the curl correction effect by the discharge decurling unit 170 and the double-sided decurling unit 870 can be easily obtained.

The image forming apparatus 1 is capable of printing on both sides of a sheet S. During single-sided image forming, in which a toner image is formed on one side of a sheet S, the sheet S with the toner image fixed on the first side is conveyed from the discharge conveying path 120 to the discharge portion 175 and discharged to the discharge tray (not shown). In the discharge portion 175, the sheet S is conveyed with the surface on which the toner image was formed immediately before (referred to as the image forming surface for convenience) facing upward. In the present embodiment, even if the sheet S curls due to the heat generated during the toner image fixing, the curl of the sheet S is corrected by the discharge decurling unit 170 located in the discharge portion 175.

On the other hand, during double-sided image forming, in which a toner image is formed on both sides of a sheet S, the sheet S with the toner image fixed on the first side is conveyed from the discharge conveying path 120 to the reversing portion 130. In the discharge conveying path 120, a flapper 160 switches the branch of the conveying path between conveying the sheet S to the discharge portion 175 and conveying the sheet S to the reversing portion 130.

The reversing portion 130 has a first reverse conveying path 130*a* that conveys a sheet sent in the arrow U direction from the fixing unit 100 in the first conveying direction (the direction intersecting the arrow U direction) and then reverses it in the second conveying direction opposite to the first direction. In the present embodiment, the first reverse conveying path 130*a* performs a switchback operation in which the conveying direction of the sheet S is reversed from vertically downward to upward so that the leading end and trailing end of the sheet S are switched.

The reversing portion 130 has a second reversing conveying path 130*b* that guides the sheet fed from the first reverse conveying path 130*a* in the direction opposite to the arrow U direction. The second reverse conveying path 130*b* is a retracting portion for temporarily retracting the sheet S when switching back the sheet S.

The sheet S switched back in the first reverse conveying path 130*a* is conveyed to the second double-sided conveying path 150. It is then fed to the registration unit 30 through the intermediate double-sided conveying path 860 and the first double-sided conveying path 60. In these second double-sided conveying path 150, intermediate double-sided conveying path 860, and first double-sided conveying path 60, the sheet S is fed with the double-sided image forming side (first side) facing up. Then, in the registration unit 30, the sheet S is fed toward the secondary transfer nip portion T2 with the image forming side (first side) facing down, in other words, with the second side on which no toner image is formed facing the intermediary transfer belt 50.

At the secondary transfer nip portion T2, the toner image formed on the intermediary transfer belt 50 is secondarily transferred to the second side of the sheet S. The sheet S is then subjected to fixing of the toner image by the fixing unit 100, and is discharged to a discharge portion (not shown) via the discharge conveying path 120 and the discharge portion 175 to a discharge tray (not shown).

<Double-Sided Decurling Unit>

Figure 2:
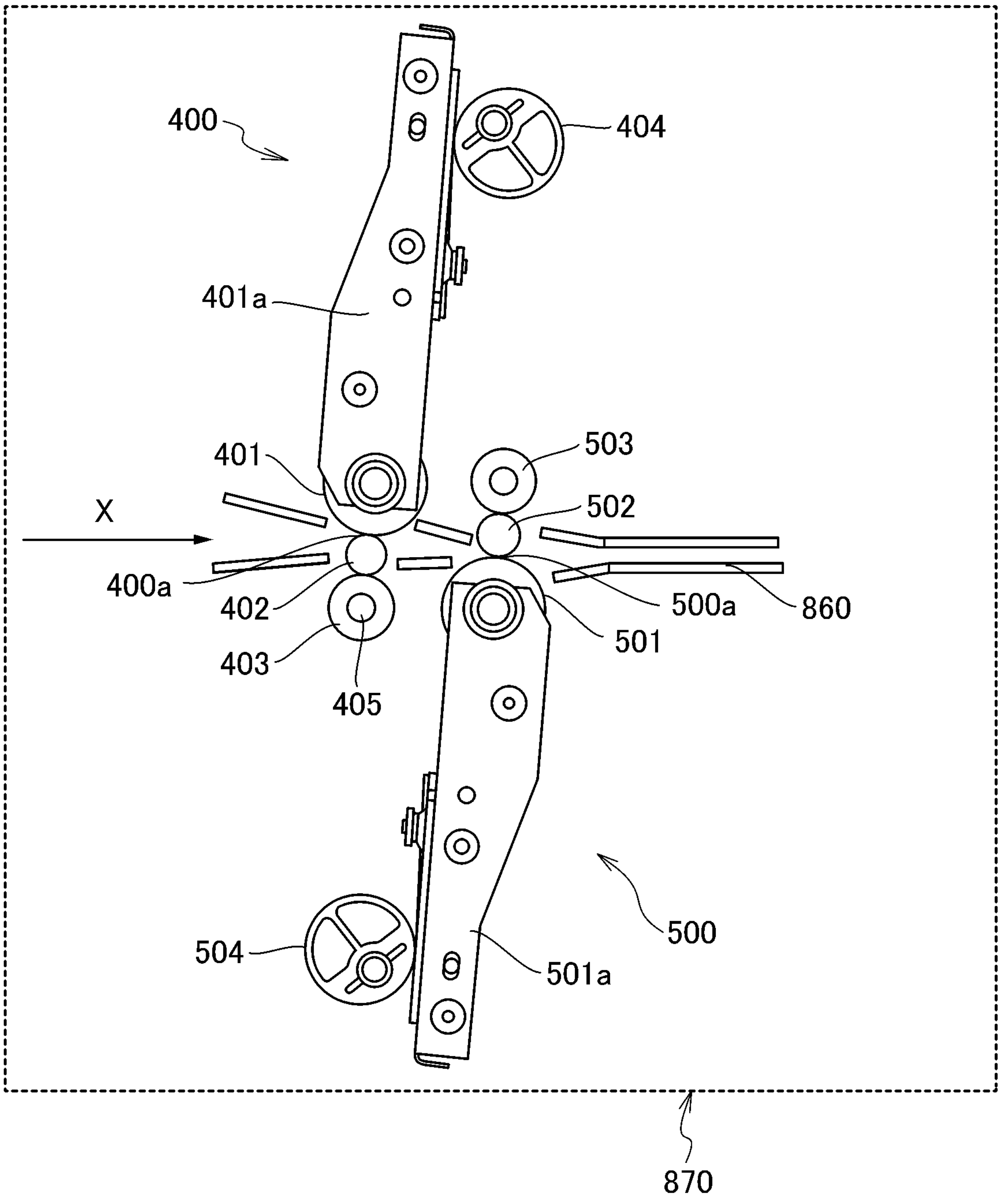
FIG. 2 is a side view showing the double-sided decurl unit.
Figure 3:
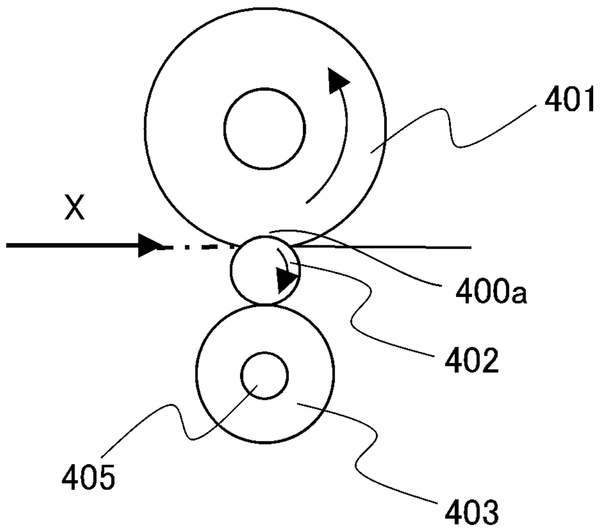
FIG. 3 is an enlarged view showing the sponge rubber roller, metal roller, and backup roller.

Next, the double-sided decurling unit 870, which is located in the intermediate double-sided conveying path 860 as a re-feeding path, is described using FIGS. 2 and 3 with reference to FIG. 1. In FIGS. 2 and 3, the X direction indicates the feeding direction of a sheet S on the intermediate double-sided conveying path 860.

As shown in FIG. 2, the double-sided decurling unit 870 as a curl correction unit has a first correction portion 400 for correcting lower convex-shaped curls on the sheet S and a second correction portion 500 for correcting upper convex-shaped curls on the sheet S.

The first correction portion 400 has a metal roller 402, which is a hard sheet feeding roller made of stainless steel, for example, and a sponge rubber roller 401. The metal roller 402 is rotatably supported by bearings fixed to the frame (not shown) of the image forming apparatus 1 at both ends of the rotation shaft portion in the width direction that intersects the feeding roller direction of the sheet S. The metal roller 402 rotates when the driving force of a driving motor (not shown) is transmitted to the rotating shaft portion via a gear train (not shown).

The sponge rubber roller 401 as the second rotating member is a sheet conveying rotating member with a metal portion, such as stainless steel, of a rotating shaft and a urethane foam or other foam material with a resin coated surface. The sponge rubber roller 401 is supported by bearings fixed to each of the two ends of a roller holding plate 401*a* in the width direction, and the rotation shaft is rotatable. The roller holding plate 401*a* is pivotably mounted on the frame (not shown) of the image forming apparatus 1. The roller holding plate 401*a* is erected in an upward direction from the intermediate double-sided conveying path 860 side to the third pre-fixing conveying path 852 side, and a double-sided first decurling cam 404 is in contact with the upper end side near the third pre-fixing conveying path 852.

Figure 5:
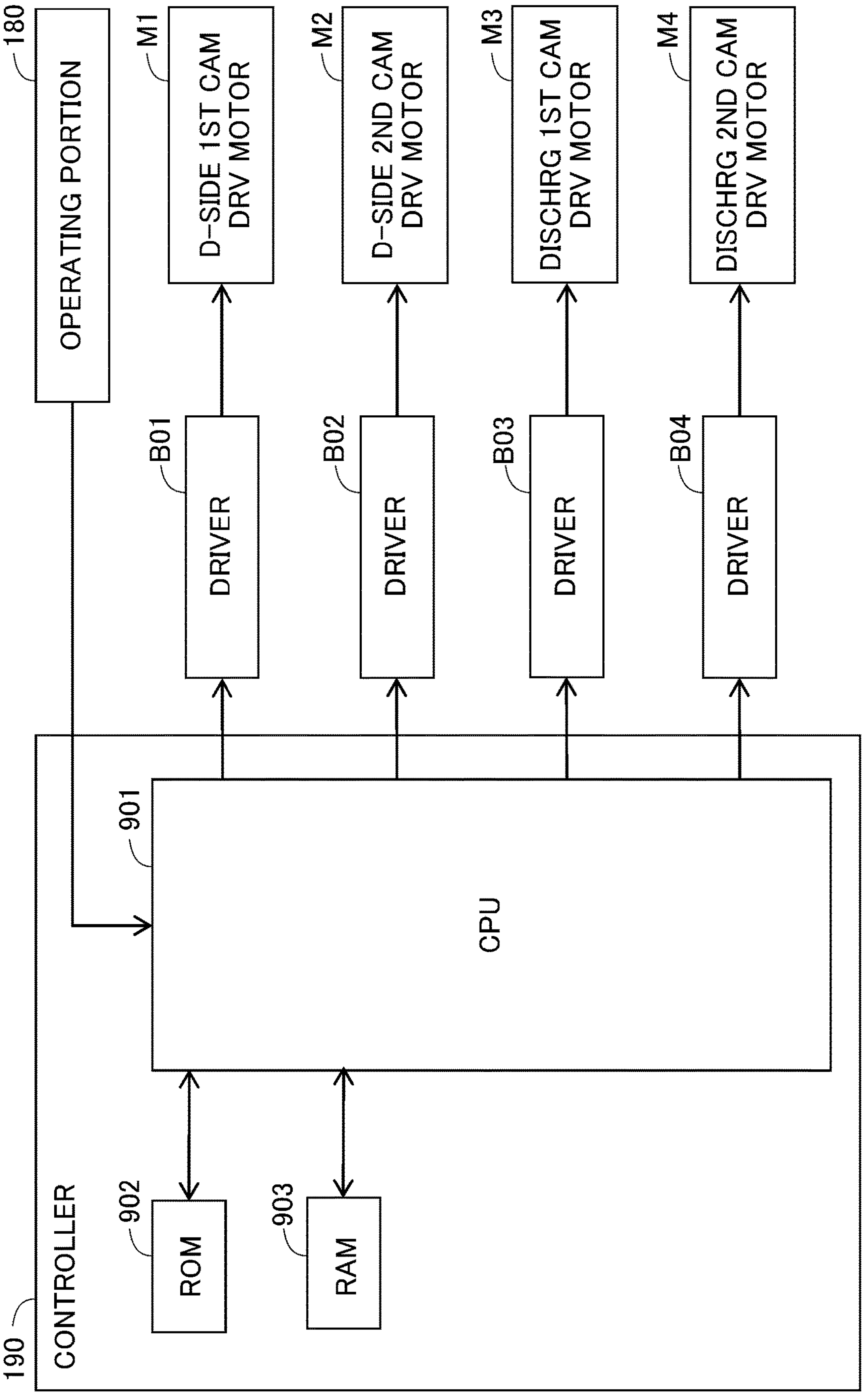
FIG. 5 is a control block view of the curl correction control system.

The sponge rubber roller 401 presses the metal roller 402 as the first rotating member in response to the swing of the roller holding plate 401*a* under the action of the double-sided first decurling cam 404. The double-sided first decurling cam 404 is rotated by the double-sided first cam driving motor M1 (see FIG. 5), described below, to move the sponge rubber roller 401 against the metal roller 402. The sponge rubber roller 401 rotates following the metal roller 402 due to the frictional force generated between it and the rotating metal roller 402. The sponge rubber roller 401 is not limited to those made of foamed urethane foam, but may also be made of non-foamed elastic rubber. The outer diameter of the metal roller 402 is, for example, 8 mm, and the outer diameter of the sponge rubber roller 401 is larger than the metal roller 402, for example, 20 mm. The sponge rubber roller 401 may not be limited to moving the metal roller 402 against the metal roller 402, but the metal roller 402 may be able to move against the sponge rubber roller 401.

As shown in FIG. 3, the metal roller 402 and the sponge rubber roller 401 feed the sheet S in the X direction in the figure while correcting the curl of the sheet S. The sponge rubber roller 401 is an elastic roller that can be elastically deformed, and since it is pressed against the metal roller 402, the surface of the sponge rubber roller 401 is elastically deformed into a concave shape. In the case of the first correction portion 400, the sponge rubber roller 401 is positioned above the metal roller 402, so the sponge rubber roller 401 is concave to the upper side. Thus, a first nip portion 400*a* is formed between the metal roller 402 and the sponge rubber roller 401.

In the present embodiment, a metal backup roller 403 is in contact with the metal roller 402 on the opposite side of the sponge rubber roller 401. The backup roller 403 is rotatably supported by bearings fixed to the frame (not shown) of the image forming apparatus 1 at both ends of the shaft portion 405 in the width direction. The backup roller 403 prevents the metal roller 402 from bending and deforming due to the pressing force of the sponge rubber roller 401 in order to properly form the first nip portion 400*a*.

In the first nip portion 400*a*, a force is applied to the sheet S being conveyed through the intermediate double-sided conveying path 860 to make the first side of the sheet S (the upper side in FIG. 2) convex and curved. In other words, the sheet S is upper curled by being fed by the metal roller 402 while being wrapped around the circumferential surface of the metal roller 402 as it passes through the first nip portion 400*a*. Hence, the lower convex shape curl is corrected in the first correction portion 400.

The second correction portion 500 has the same configuration as the first correction portion 400 described above. That is, the second correction section 500 has a metal roller 502 as the third rotating member, a sponge rubber roller 501 as the fourth rotating member, and a backup roller 503, as shown in FIG. 2. However, the second correction portion 500 is located in the intermediate double-sided conveying path 860 so that its vertical orientation is opposite to that of the first correction portion 400.

A second nip portion 500*a* is formed between the metal roller 502 and the sponge rubber roller 501. In the second nip portion 500*a*, a force is applied to the sheet S conveyed in the intermediate double-sided conveying path 860 to concave and curve the first side (top side) of the sheet S. In other words, in the second correction portion 500, when the sheet S passes through the second nip portion 500*a*, it is lower curled by being fed by the metal roller 502 while being wrapped around the circumferential surface of the metal roller 502. Hence, the upper convex shape curl is corrected in the second correction portion 500. The sponge rubber roller 501 and the metal roller 502 need only be movable, as long as one of them is movable with respect to the other.

In the present embodiment, the second correction portion 500 is located downstream of the first correction portion 400 with respect to the feeding direction (arrow X direction) of the sheet S in the intermediate double-sided conveying path 860. That is, the metal roller 502 is positioned downstream in the feeding direction of the sheet S from the sponge rubber roller 401, and the sponge rubber roller 501 is positioned downstream in the feeding direction of the sheet S from the metal roller 402.

<Discharge Decurling Unit>

Figure 4:
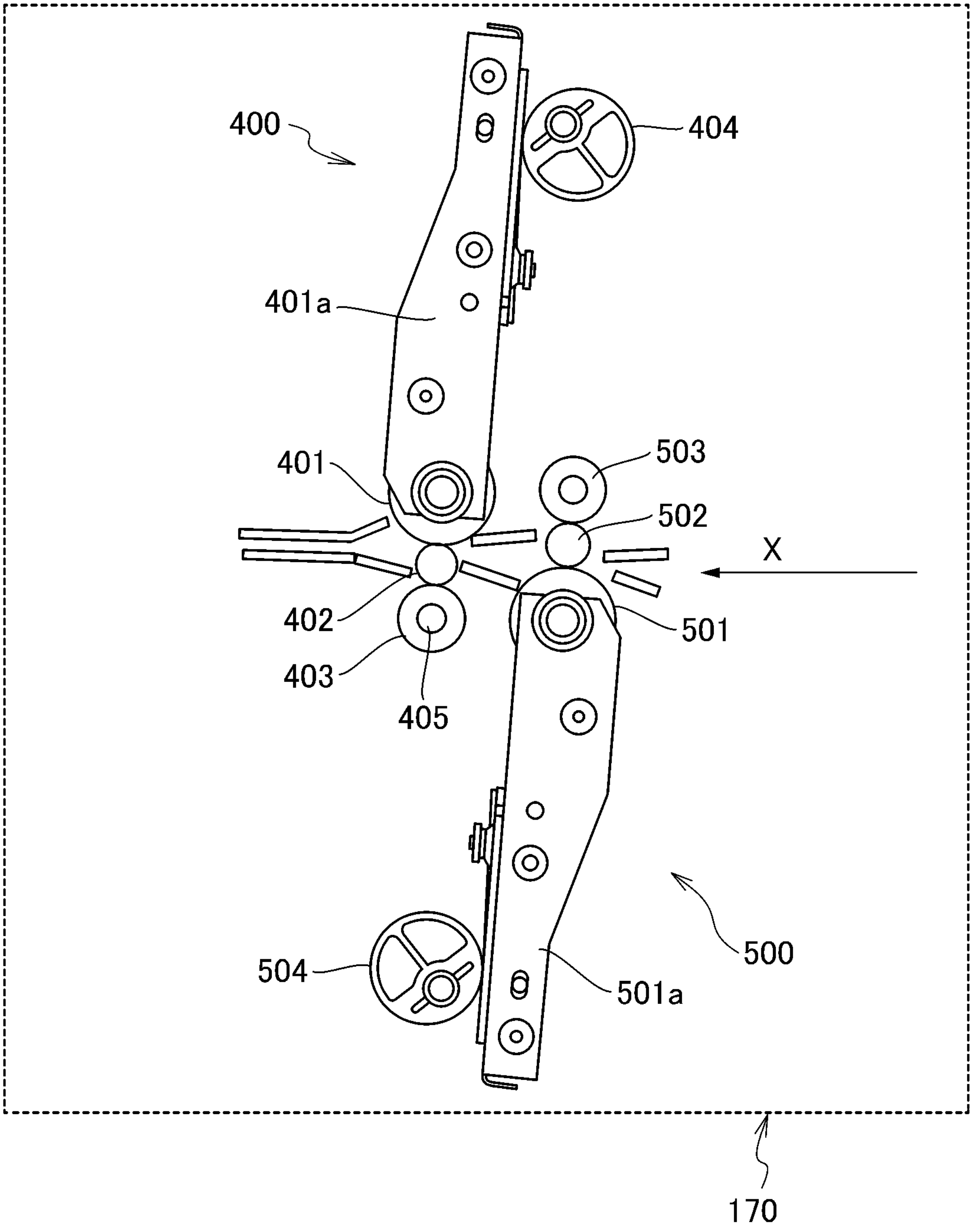
FIG. 4 is a side view of the discharging decurl unit.

A discharge decurling unit 170 located in the discharge portion 175 may have the same or opposite arrangement of the first correction portion 400 and the second correction portion 500 of the double-sided decurling unit 870 described above. FIG. 4 shows the discharge decurling unit 170 with the opposite arrangement of the first correction portion 400 and the second correction portion 500. In FIG. 4, the first correction portion 400 and the second correction portion 500 have the same configuration, so the same symbols are used and the explanation is omitted.

In the discharge decurling unit 170, the first correction portion 400 for correcting the curl of the lower convex shape is located downstream of the second correction portion 500 for correcting the curl of the upper convex shape with respect to the feeding direction (X direction) of the sheet S. This is because the sheet S is conveyed without passing through the curvature described below, which is curved enough to be curled on the sheet S. That is, since the feeding path from the fixing unit 100 to the discharge portion 175 does not have curved portions that could curl the sheet S, the sheet S being fed to the discharge portion 175 does not have an upper convex curl or a lower convex curl caused by the curved portions. Therefore, in the discharge decurling unit 170, the first correction portion 400 and the second correction portion 500 should be able to correct curl caused by heat during toner image fixing. Therefore, the first correction portion 400 and the second correction portion 500 may be located either upstream or downstream, respectively.

<Control Portion>

In the present embodiment, the image forming apparatus 1 is equipped with a control portion 190. The control portion 190 is described here mainly with reference to the curl correction control system that can control the double-sided decurling unit 870 and the discharge decurling unit 170, using FIG. 5 with reference to FIGS. 1 and 2. In addition to those shown in the figures, various other devices are connected to the control portion 190, such as various parts of the image forming apparatus 1 and driving portions (e.g., motors and power supplies) for operating those portions.

However, since this is not the main purpose of the present invention, their drawings and explanations are omitted here.

The control portion 190 controls various operations related to image forming control and is composed of, for example, a CPU 901 (Central Processing Unit), ROM 902 (Read Only Memory) and RAM 903 (Random Access Memory). ROM 902 and RAM 903 store various programs such as image forming process (not shown) and "curl correction process" (see FIGS. 6 and 7), image data for forming toner images, and various data such as pressing amount according to the type of sheet S. RAM 903 can also temporarily store the results of arithmetic processing and other data associated with the execution of various programs.

An operating portion 180 is connected to the control portion 190. The operating portion 180 has a display portion such as an LCD panel that displays information to the user and an input device such as physical keys or a touch panel function portion of the LCD panel that allows the user to input commands and data to the control portion 190. By using the operating portion 180, the user can set, for example, whether the sheet type to be used for the current image forming job is thin paper with basis weight less than the threshold value or thick paper with basis weight greater than the threshold value. The control portion 190 controls the double-sided decurling unit 870 and the discharge decurling unit 170 based on various information received from the operating portion 180 when the curl correction process is executed.

The control portion 190 is connected to a double-sided first cam drive motor M1, a double-sided second cam drive motor M2, a discharge first cam drive motor M3, and a discharge second cam drive motor M4 via respective drivers B01, B02, B03, and B04. The double-sided first cam drive motor M1 as the first driving portion and the double-sided second cam drive motor M2 as the second driving portion rotate and drive the double-sided first decurling cam 404 and the double-sided second decurling cam 504, respectively, of the double-sided decurling unit 870. The discharge first cam drive motor M3 and the discharge second cam drive motor M4 rotate and drive the discharge first decurling cam 404 and the discharge second decurling cam 504 of the discharge decurling unit 170, respectively. This enables the sponge rubber roller 401 to move against the metal roller 402 and the sponge rubber roller 501 to move against the metal roller 502. Each driver B01, B02, B03, and B04 sends driving signals to each motor (M1 to M4) based on the control signals received from the control portion 190.

<Curl Correction Process>

In the present embodiment, the curl of a sheet S is corrected by the discharge decurling unit 170 when the sheet S is discharged. During double-sided image formation, in which toner images are formed on both sides of a sheet S, the curl of the first side of the sheet S is corrected by the double-sided decurling unit 870, and the curl of the second side of the sheet S is corrected by the discharge decurling unit 170.

Figure 6:
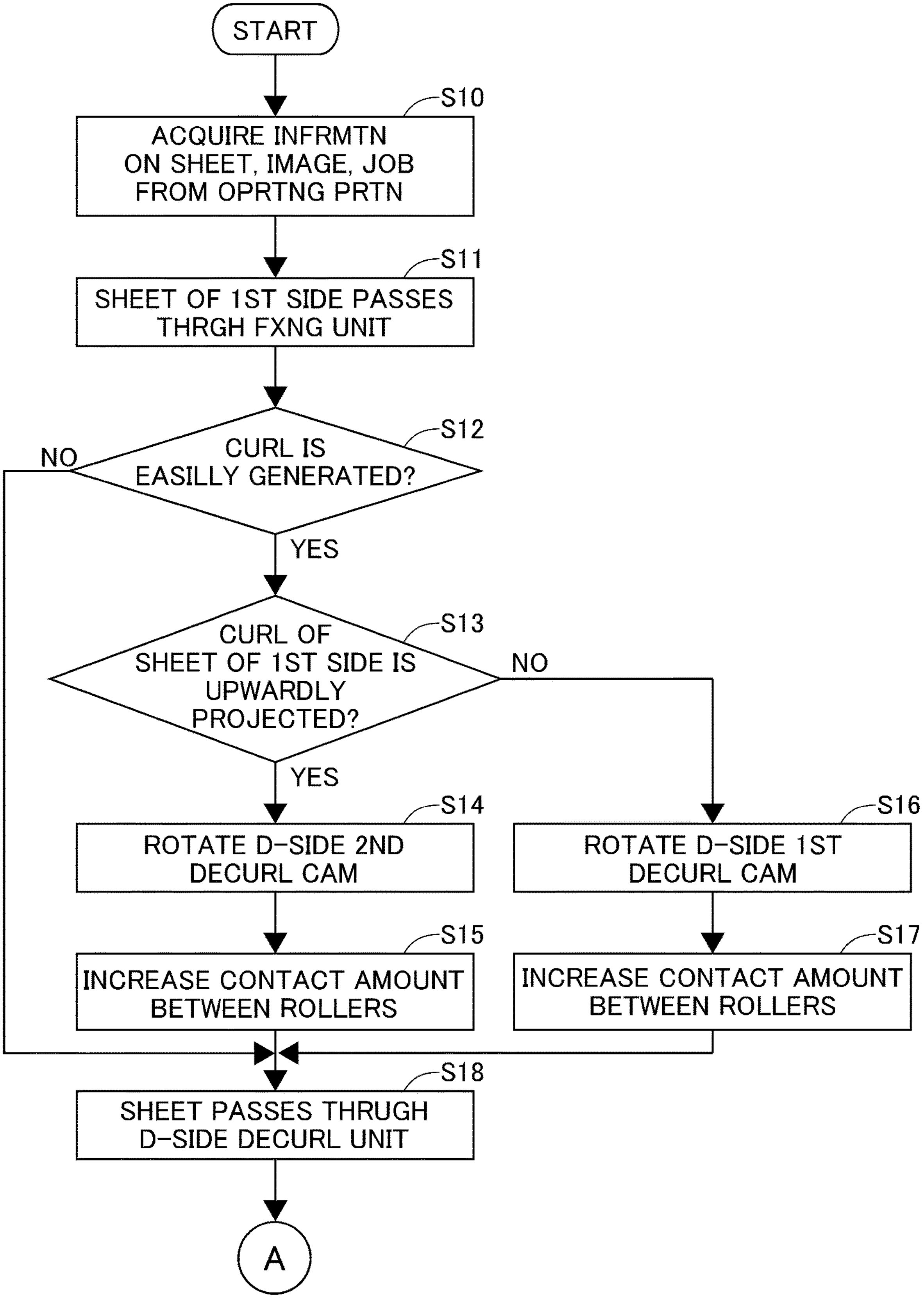
FIG. 6 is a flowchart showing the first half of the curl correction control process.
Figure 7:
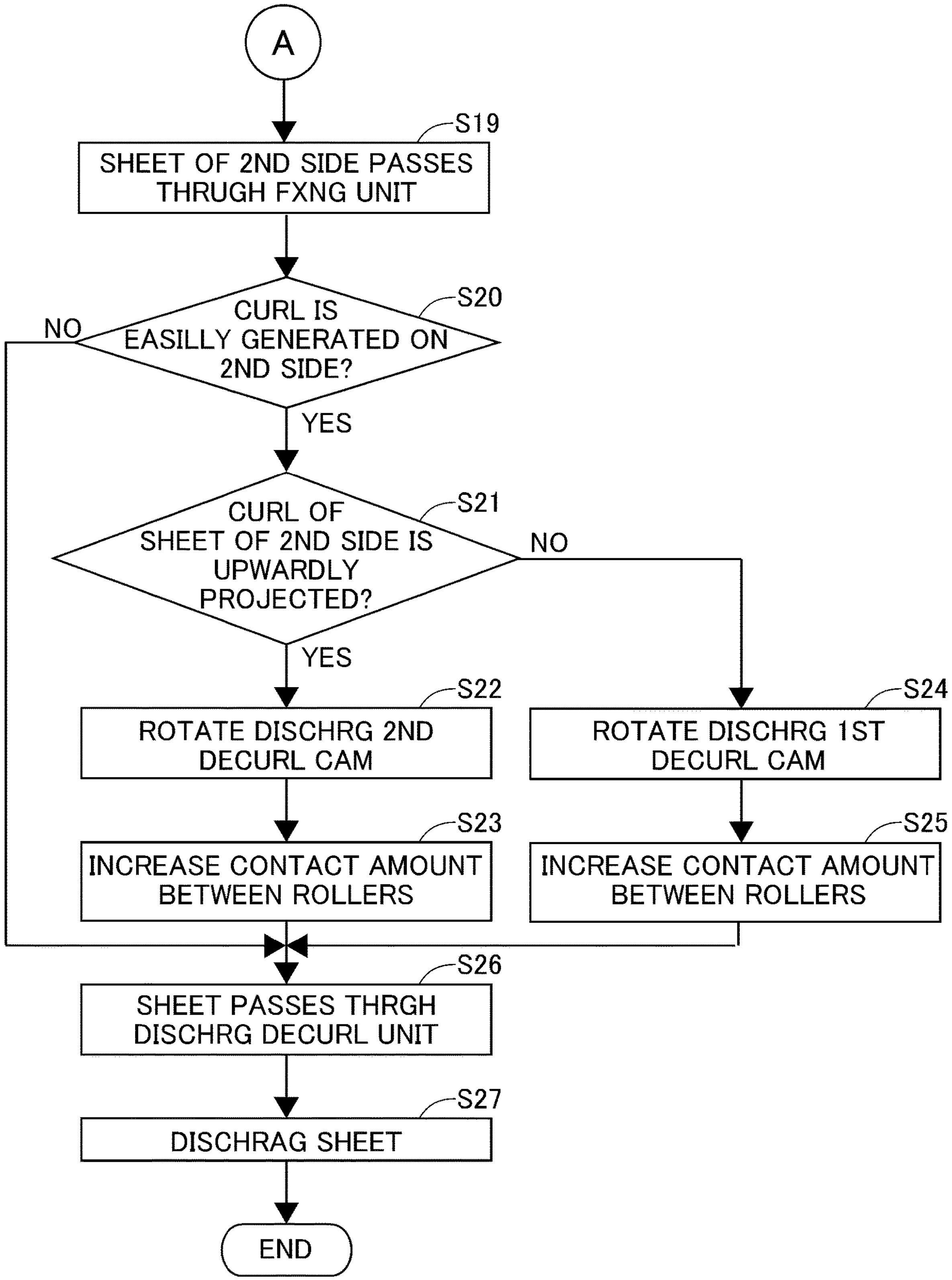
FIG. 7 is a flowchart showing the second half processing that follows the first half processing of curl correction control.

The "curl correction process" controlling the discharge decurling unit 170 and the double-sided decurling unit 870 is explained below using FIG. 6 through part (b) of FIG. 9 with reference to FIGS. 1, 2, 4 and 5. The "curl correction process" is repeatedly executed by the control portion 190 from the start to the end of the "image forming job". For convenience of the drawings, FIGS. 6 and 7 show the series of "curl correction control" divided into the first half and second half processes. For ease of understanding, the curl correction of sheet S during double-sided image formation is explained here.

As shown in FIG. 6, the control portion 190 obtains various information input by the user from the operating portion 180, such as the type of sheet S, image forming information, and whether it is a single-sided or double-sided image forming job (S10). The control portion 190 passes the sheet S with the toner image formed on the first side through the fixing unit 100 (S11). The control portion 190 determines the curl state of the sheet S after fixing the toner image on the first side due to heat based on the above various information received from the operating portion 180 (S12, S13). As the curl state of the sheet S, the control portion 190 determines whether the sheet S is prone to curl (S12) and whether the first side of the sheet S is prone to become convex (S13). The control portion 190 then controls the double-sided decurling unit 870 according to the curl state of the sheet S on the first side (S14-S17).

Figure 8:
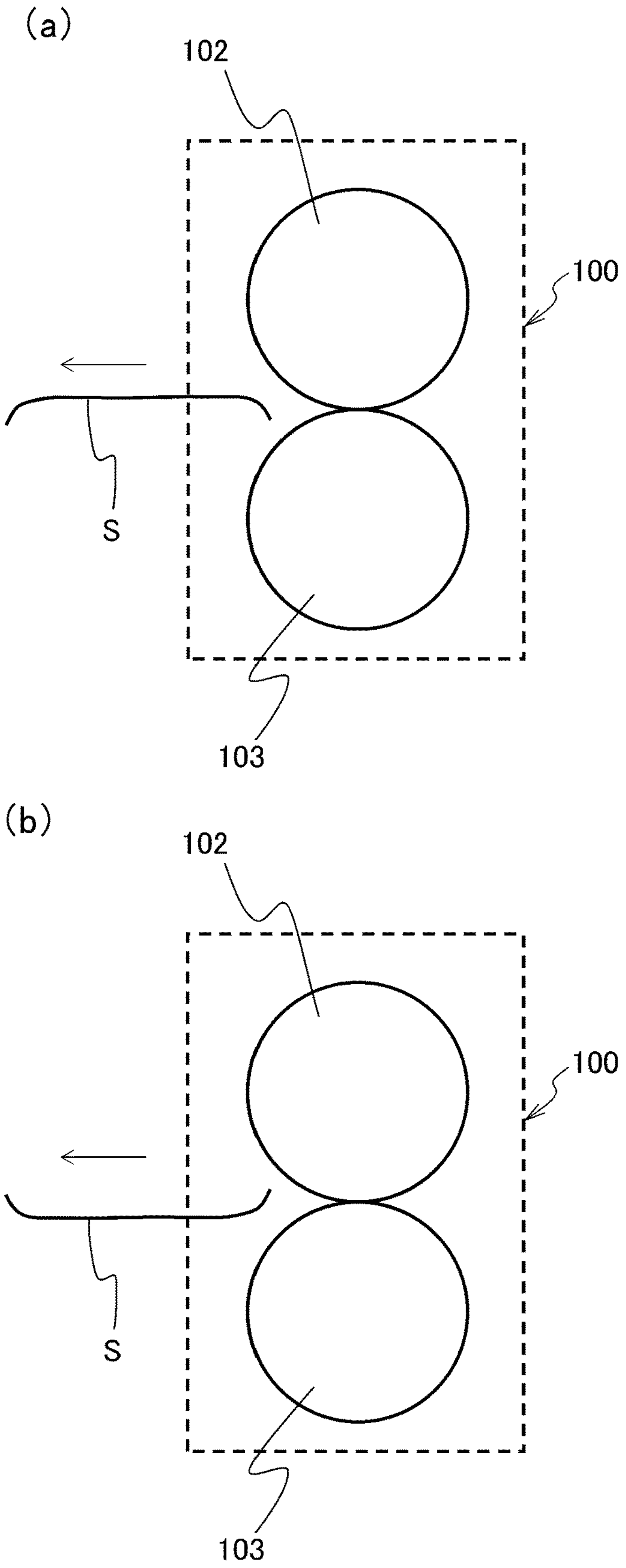
FIG. 8 is a schematic view showing the curled state of a sheet after passing through the fixing unit, part (a) when an upper convex curl occurs, and part (b) when a lower convex curl occurs.

For example, when the sheet S is thin paper, as shown in part (a) of FIG. 8, the sheet S on which the toner image is fixed on the first side tends to curl in an upper convex shape with the first side (image forming side) curved convexly. That is, in the case of a thin sheet S with a toner image formed on the first side, when the sheet S is heated by the heating roller 102 as it passes through the fixing unit 100, both ends of the sheet S in the feeding direction can curl toward away from the heating roller 102.

Figure 9:
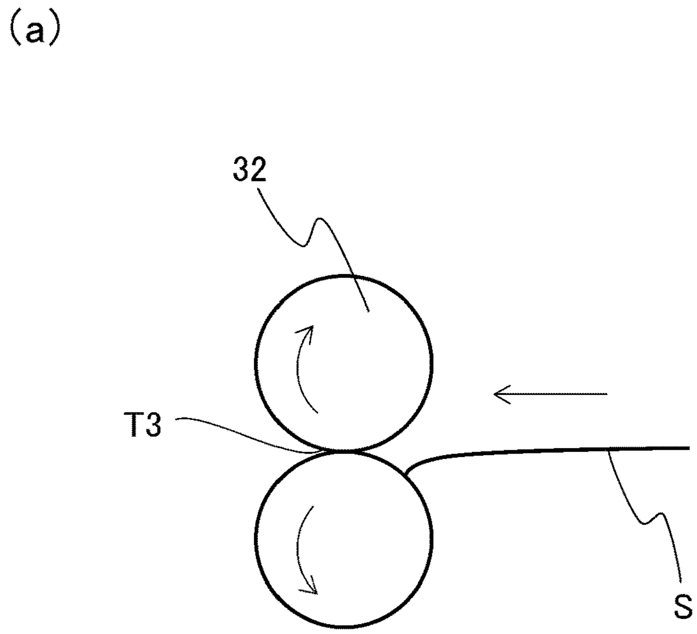
FIG. 9, part (a) and part (b), is a schematic view showing the state of the sheet against the roller nip, part (a) when no curl correction is performed, and part (b) when curl correction is performed.
Figure 9:
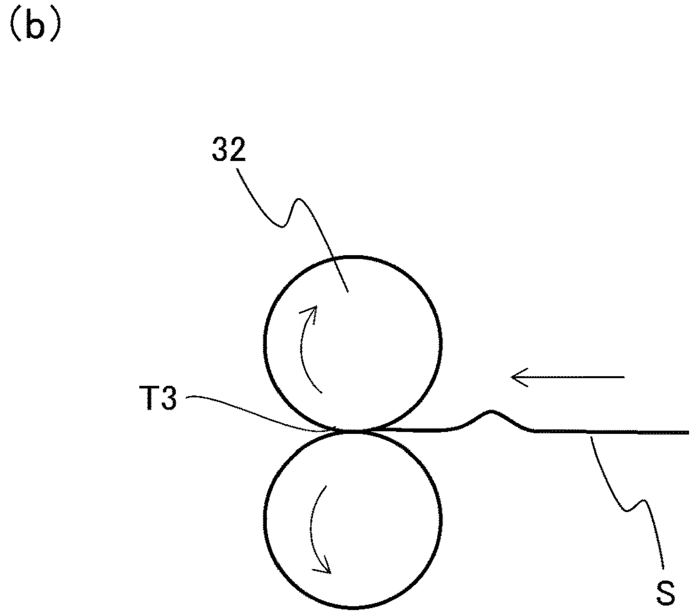

When the upper convex curl is not corrected, as shown in part (a) of FIG. 9, it is difficult for the leading end of the sheet S to contact the roller nip portion T3 of the registration roller pair 32. If the leading end of the sheet S does not contact the roller nip portion T3 properly, the misalignment correction and skew correction of the sheet S by the registration roller pair 32 may not be properly performed.

Therefore, based on various information received from the operating portion 180, the control portion 190 rotates the double-sided second decurling cam 504 (S14) when it determines that the sheet S is prone to curl (YES in S12) and the first side is prone to be convex (YES in S13). That is, in the double-sided decurling unit 870, the control portion 190 drives the double-sided second cam driving motor M2 to rotate the double-sided second decurling cam 504 of the second correction portion 500.

At this time, the control portion 190 makes the amount of pressing pressure between the metal roller 502 and the sponge rubber roller 501 larger than that between the metal roller 402 and the sponge rubber roller 401 in the first correction portion 400 (S15). As an example, when the sheet S is thin paper, the metal roller 502 is pressed against the sponge rubber roller 501 so that the amount of pressing pressure between the metal roller 502 and the sponge rubber roller 501 is 2 mm. The standard value of the amount of pressure between the metal roller 502 and the sponge rubber roller 501, and between the metal roller 402 and the sponge rubber roller 401 is, for example, 1.0 mm. This way, when the sheet S is thin paper, it is easier to obtain the effect of the upper convex shape curl correction by the double-sided decurling unit 870. The control portion 190 then passes the sheet S from the double-sided decurling unit 870 (S18).

When a sheet S curled into an upper convex shape passes through the second correction portion 500, the sheet S is fed through the second nip portion 500*a* with the sponge rubber roller 501 while being wrapped around the metal roller 502. At this time, the curl of the sheet S, which has curled into an upper convex shape, is corrected. When the upper convex curl is properly corrected, as shown in part (b) of FIG. 9, the leading end of the sheet S properly contacts the roller nip portion T3 of the registration roller pair 32, so that the misalignment correction and skew correction of the sheet S by the registration roller pair 32 are properly performed.

On the other hand, if the sheet is a thick paper, as shown in part (b) of FIG. 8, the sheet S on which the toner image is fixed on the first side tends to curl in a lower convex shape with the first side (image forming side) curved concave, in other words, the second side curved convex. That is, in the case of a thick paper sheet S with a toner image on the first side, when the toner is heated by the heating roller 102 as it passes through the fixing unit 100, the subsequent contraction of the toner can cause both ends of the sheet S in the feeding direction to curl toward the heating roller 102.

Therefore, based on various information received from the operating portion 180, the control portion 190 rotates the double-sided first decurling cam 404 (S16) when it determines that the sheet S is prone to curl (YES in S12) and the second side is prone to become convex (NO in S13). That is, in the double-sided decurling unit 870, the control portion 190 drives the double-sided first cam drive motor M1 to rotate the double-sided first decurling cam 404 of the first correction portion 400.

At this time, the control portion 190 makes the amount of pressing pressure between the metal roller 402 and the sponge rubber roller 401 larger than that between the metal roller 502 and the sponge rubber roller 501 in the second correction portion 500 (S17). As an example, when the sheet S is thick paper, the metal roller 402 is pressed against the sponge rubber roller 401 so that the amount of pressure between the metal roller 402 and the sponge rubber roller 401 is 2 mm. This way, when the sheet S is thick paper, it is easier to obtain the effect of curl correction of the lower convex shape by the double-sided decurling unit 870. The control portion 190 then passes the sheet S through the double-sided decurling unit 870 (S18).

When a sheet S curled into a lower convex shape passes through the first correction portion 400, the sheet S is wrapped around the metal roller 402 and then fed through the first nip portion 400*a* with the sponge rubber roller 401. At this time, the curl of the sheet S, which has curled into a lower convex shape, is corrected. When the curl of the lower convex shape is properly corrected, as shown in part (b) of FIG. 9, the leading end of the sheet S properly contacts the roller nip portion T3 of the registration roller pair 32, and the misalignment correction and skew correction of the sheet S by the registration roller pair 32 are properly performed.

After fixing the toner image on the second side, the control portion 190 passes the sheet S with the toner image on the second side through the fixing unit 100 (S19), as shown in FIG. 7. The control portion 190 determines the curl state of the sheet S after fixing the toner image on the second side with heat (S20, S21) based on the above various information received from the operating portion 180. The control portion 190 determines whether the sheet S is prone to curl (S20) and whether the second side of the sheet S is prone to become convex (S21). The control portion 190 then controls the discharge decurling unit 170 according to the curl condition of the second side of the sheet S (S22-S25). Even after fixing the toner image on the second side, the sheet S can have an upper convex shape curl or a lower convex shape curl. Therefore, in the present embodiment, the discharge decurling unit 170 (see FIG. 4) can correct the curl that occurs on the sheet S after the toner image is fixed on the second side.

For example, if the sheet S is thin paper, an upper convex shape curl can occur on the second side as well as the first side. Therefore, the control portion 190 rotates the discharge second decurling cam 504 in the discharge decurling unit 170 (S22). That is, in order to rotate the discharge second decurling cam 504 of the second correction portion 500 in the discharge decurling unit 170, the control portion 190 drives the discharge second cam drive motor M4. At this time, the control portion 190 increases the amount of pressure between the metal roller 502 and the sponge rubber roller 501 more than that between the metal roller 402 and the sponge rubber roller 401 in the first correction portion 400 (S23). When a sheet S curled into an upper convex shape passes through the second correction portion 500, the sheet S is fed through the nip portion with the sponge rubber roller 501 while being wrapped around the metal roller 502. At this time, the curled sheet S, which has curled into an upper convex shape, is corrected. The control portion 190 then passes the sheet S through the discharge decurling unit 170 (S26) and discharges it out of the apparatus through the discharge portion 175 (S27).

On the other hand, if the sheet S is thick paper, a curl of a lower convex shape can occur on the second side as well as on the first side. Therefore, the control portion 190 rotates the discharge first decurling cam 404 in the discharge decurling unit 170 (S24). That is, in order to rotate the discharge first decurling cam 404 of the first correction portion 400 in the discharge decurling unit 170, the control portion 190 drives the discharge first cam drive motor M3. At this time, the control portion 190 increases the amount of pressure between the metal roller 402 and the sponge rubber roller 401 more than that between the metal roller 502 and the sponge rubber roller 501 in the second correction portion 500 (S25). When the sheet S curled into a lower convex shape passes through the first correction portion 400, the sheet S is wrapped around the metal roller 402 and fed through the nip portion with the sponge rubber roller 401. At this time, the curled sheet S, which has curled into a lower convex shape, is corrected. The control portion 190 then passes the sheet S through the discharge decurling unit 170 (S26) and discharges it out of the apparatus through the discharge portion 175 (S27).

Returning to FIG. 1, in the present embodiment, the first pre-fixing conveying path 56, the second pre-fixing conveying path 851, the third pre-fixing conveying path 852, the second double-sided conveying path 150, the intermediate double-sided conveying path 860, and the first double-sided conveying path 60 all extend in an abbreviated horizontal direction. With respect to the vertical conveying direction in the second casing 1*b*, the second double-sided conveying path 150 is located below the fixing unit 100 and the cooling unit 110, and the second reversing conveying path 130*b* is also located below the second double-sided conveying path 150. That is, the fixing unit 100 and the cooling unit 110, which are located above the second reverse conveying path 130*b*, are all positioned in a relationship of at least partial overlap with the reversing portion 130 when viewed in the vertical direction. The second reverse conveying path 130*b* and feeding units 10*a* and 10*b* are arranged horizontally side by side, and their occupied areas in the vertical direction overlap.

The above arrangement is effective in reducing the size of the image forming apparatus 1 due to the placement of the second reverse conveying path 130*b*. However, the second reverse conveying path 130*b* has a plurality of curved portions 1301, which have a steeply curved shape with a small curvature ratio. As shown in FIG. 1, these plurality of curved portions 1301 are formed inwardly curved. Therefore, when a sheet S is conveyed along the second reverse conveying path 130*b*, the curved portions 1301 apply a strong load to the sheet S that causes an upper convex curl. Therefore, depending on the type of sheet S, an upper convex curl may be generated on the sheet S by the curved portion 1301, regardless of whether the curl is caused by the heat generated during the toner image fixing process or not.

Here, as a comparative example, although the figure is omitted, consider the case where, in the double-sided decurling unit 870, the second correction portion 500 for correcting curl of an upper convex shape is placed upstream of the first correction portion 400 for correcting curl of a lower convex shape, as opposed to the present embodiment (see FIG. 2). Even in this comparative example, the second correction portion 500 can correct the curl of the upper convex shape.

However, in the comparative example, even though the upper convex shape curl is corrected by the second correction portion 500, when the sheet S subsequently passes through the first correction portion 400, the first correction portion 400 can cause the sheet S to curl in an upper convex shape. As a result, misalignment correction or skew correction of the sheet S by the registration unit 30 may not be properly performed, the sheet S may get stuck in the secondary transfer nip portion T2 or fixing nip portion, or the sheet S may wrinkle.

In contrast, as described above, in the double-sided decurling unit 870, the second correction portion 500 for correcting the curl of the upper convex shape is located downstream of the first correction portion 400 for correcting the curl of the lower convex shape. With the second correction portion 500 located downstream of the first correction portion 400, the sheet S passes through the first correction portion 400 first and then through the second correction portion 500. Therefore, even if an upper convex curl is generated in the sheet S due to the curved portion 1301 with a small curvature rate in addition to the curl caused by heat, the upper convex curl can be corrected by the second correction portion 500 without causing the upper convex curl by the first correction portion 400.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-168301 filed on Oct. 20, 2022, which is hereby incorporated by reference herein in its entirety.

What is claimed is:

1. An image forming apparatus comprising:

an image forming portion configured to form a toner image on a sheet;

a fixing portion configured to fix the toner image on the sheet on which the toner image is formed by the image forming portion;

a discharging portion to which the sheet passing through the fixing portion is discharged;

a discharge conveying path configured to convey the sheet passing through the fixing portion toward the discharging portion;

a reversing portion including a reverse conveying path branched from the discharge conveying path and configured to reverse the sheet conveyed to the reverse conveying path in a first conveying direction to a second conveying direction opposite to the first conveying direction;

a reconveying path branched from the reverse conveying path and, during double-side image forming operation in which the toner image is formed and fixed on a first surface and a second surface opposite to the first surface of the sheet, through which the sheet reversed in the reversing portion is reconveyed to the image forming portion after fixing the toner image of the first surface; and a curl correcting portion disposed in the reconveying path and capable of correcting curl of the sheet conveyed through the reconveying path, wherein the curl correcting portion includes (1) a first correcting portion including a first elastic roller in contact with the first surface and a first metallic roller in contact with the second surface, and (2) a second correcting portion including a second metallic roller in contact with the first surface and a second elastic roller in contact with the second surface, wherein the first elastic roller and the first metallic roller form a first nip portion nipping and conveying the sheet, and the first metallic roller corrects the curl of the sheet by deforming the first elastic roller, wherein the second metallic roller and the second elastic roller form a second nip portion nipping and conveying the sheet, and the second metallic roller corrects the curl of the sheet by deforming the second elastic roller, and wherein the second correcting portion is disposed downstream of the first correcting portion with respect to a conveyance direction of the sheet.

2. An image forming apparatus comprising:

an image forming portion configured to form a toner image on a sheet;

a fixing portion configured to fix the toner image on the sheet on which the toner image is formed by the image forming portion;

a discharging portion to which the sheet passing through the fixing portion is discharged;

a discharge conveying path configured to convey the sheet passing through the fixing portion toward the discharging portion;

a reversing portion including a reverse conveying path branched from the discharge conveying path and configured to reverse the sheet conveyed to the reverse conveying path in a first conveying direction to a second conveying direction opposite to the first conveying direction;

a reconveying path branched from the reverse conveying path and, during double-side image forming operation in which the toner image is formed and fixed on a first surface and a second surface opposite to the first surface of the sheet, through which the sheet reversed in the reversing portion is reconveyed to the image forming portion after fixing the toner image of the first surface;

a curl correcting portion disposed in the reconveying path and capable of correcting curl of the sheet conveyed through the reconveying path, wherein the curl correcting portion includes (1) a first correcting portion including a first rotatable member in contact with the first surface and a second rotatable member in contact with the second surface, and (2) a second correcting portion including a third rotatable member in contact with the first surface and a fourth rotatable member in contact with the second surface, wherein the first rotatable member and the second rotatable member form a first nip portion nipping and conveying the sheet, and the second rotatable member corrects the curl of the sheet by deforming the first rotatable member, and wherein the third rotatable member and the fourth rotatable member form a second nip portion nipping and conveying the sheet, and the third rotatable member corrects the curl of the sheet by deforming the fourth rotatable member;

a first driving portion capable of moving either one of the first rotatable member and the second rotatable member relative to the other;

a second driving portion capable of moving either one of the third rotatable member and the fourth rotatable member relative to the other; and a control portion capable of controlling the first driving portion and the second driving portion, wherein the control portion increases a pressing amount between the first rotatable member and the second rotatable member more than a pressing amount between the third rotatable member and the fourth rotatable member in a case in which a basis weight of the sheet is not less than a threshold, and increases the pressing amount between the third rotatable member and the fourth rotatable member more than the pressing amount between the first rotatable member and the second rotatable member in a case in which the basis weight of the sheet is less than the threshold.

3. An image forming apparatus according to claim 1, wherein the reverse conveying path includes a bending portion configured to bend and guide the sheet.

4. An image forming apparatus comprising:

an image forming portion configured to form a toner image on a sheet;

a fixing portion configured to fix the toner image on the sheet on which the toner image is formed by the image forming portion;

a discharging portion to which the sheet passing through the fixing portion is discharged;

a discharge conveying path configured to convey the sheet passing through the fixing portion toward the discharging portion;

a reversing portion including a reverse conveying path branched from the discharge conveying path and configured to reverse the sheet conveyed to the reverse conveying path in a first conveying direction to a second conveying direction opposite to the first conveying direction;

a reconveying path branched from the reverse conveying path and, during double-side image forming operation in which the toner image is formed and fixed on a first surface and a second surface opposite to the first surface of the sheet, through which the sheet reversed in the reversing portion is reconveyed to the image forming portion after fixing the toner image of the first surface; and a curl correcting portion disposed in the reconveying path and capable of correcting curl of the sheet conveyed through the reconveying path, wherein the curl correcting portion includes (1) a first correcting portion including a first rotatable member in contact with the first surface and a second rotatable member in contact with the second surface, and (2) a second correcting portion including a third rotatable member in contact with the first surface and a fourth rotatable member in contact with the second surface, wherein the first rotatable member and the second rotatable member form a first nip portion nipping and conveying the sheet, and the second rotatable member corrects the curl of the sheet by deforming the first rotatable member, wherein the third rotatable member and the fourth rotatable member form a second nip portion nipping and conveying the sheet, and the third rotatable member corrects the curl of the sheet by deforming the fourth rotatable member, wherein the image forming portion is accommodated in a first casing, wherein the fixing portion is accommodated in a second casing, and wherein the curl correcting portion is accommodated in a third casing disposed between the first casing and the second casing.

5. An image forming apparatus according to claim 1, wherein an outer diameter of the first elastic roller is larger than an outer diameter of the first metallic roller, and wherein an outer diameter of the second elastic roller is larger than an outer diameter of the second metallic roller.

6. An image forming apparatus according to claim 2, wherein the second correcting portion is disposed downstream of the first correcting portion with respect to a conveyance direction of the sheet.

7. An image forming apparatus according to claim 2, wherein the first driving portion moves the first rotatable member relative to the second rotatable member, and wherein the second driving portion moves the fourth rotatable member relative to the third rotatable member.

8. An image forming apparatus according to claim 2, wherein the second rotatable member and the third rotatable member are metallic rollers, and wherein the first rotatable member and the fourth rotatable member are elastic rollers elastically deformable in contact with the metallic rollers.

9. An image forming apparatus according to claim 4, wherein the second correcting portion is disposed downstream of the first correcting portion with respect to a conveyance direction of the sheet.

* * * * *